United States Patent [19]

Morimoto

[11] Patent Number: 5,155,483

[45] Date of Patent: Oct. 13, 1992

[54] CHANNEL SWITCHING SYSTEM

[75] Inventor: Hideaki Morimoto, Tokyo, Japan

[73] Assignee: NEC Corporation, Tokyo, Japan

[21] Appl. No.: 681,425

[22] Filed: Apr. 5, 1991

Related U.S. Application Data

[63] Continuation of Ser. No. 269,395, Nov. 10, 1988, abandoned.

Foreign Application Priority Data

[30] Nov. 10, 1987 [JP] Japan ................ 62-284938

[51] Int. Cl.[5] .............................................. H04B 1/00
[52] U.S. Cl. .......................... 340/825.03; 340/825.010
[58] Field of Search ............ 340/825.01, 825.03; 370/16, 103; 455/39, 60, 63, 103, 209, 260; 371/8.2; 375/40

[56] References Cited

U.S. PATENT DOCUMENTS

| | | | |
|---|---|---|---|
| 4,144,414 | 3/1979 | Nicholas | 370/103 |
| 4,281,412 | 7/1981 | Wissel et al. | 375/86 |
| 4,365,248 | 12/1982 | Bargeton et al. | 370/16 |
| 4,377,728 | 3/1983 | Hilbert | 455/209 |
| 4,417,348 | 11/1983 | Abbruscato | 340/825.01 |
| 4,442,518 | 4/1984 | Morimoto et al. | 371/8.2 |
| 4,680,750 | 7/1987 | Davidow | 340/825.01 |
| 4,686,675 | 8/1987 | Morimoto et al. | 371/8.2 |
| 4,773,081 | 9/1988 | Morimoto | 340/825.01 |
| 4,774,703 | 12/1988 | Force et al. | 370/16 |
| 4,837,760 | 6/1989 | Reid et al. | 340/825.01 |

FOREIGN PATENT DOCUMENTS 180943A 5/1986 European Pat. Off. .

OTHER PUBLICATIONS

Patent Abstracts of Japan, vol. 9, No. 185 (E-332)[1908], Jul. 31, 1985; (JP-A-60 53 345).
Patent Abstracts of Japan, vol. 9, No. 325 (E-368)[2048], Dec. 20, 1985 (JP-A-60 154 735).

Primary Examiner—Donald J. Yusko
Assistant Examiner—Dervis Magistre
Attorney, Agent, or Firm—Sughrue, Mion, Zinn, Macpeak & Seas

[57] ABSTRACT

A system applicable to a digital radio communication system for switching a regular channel and a standby channel includes a demodulator associated with the standby channel. The demodulator has a phase locked loop for clock recovery the band width of which is variable. The band width of the phase lock loop is increased only when a channel switching operation is under way so as to guarantee clock synchronization.

2 Claims, 8 Drawing Sheets

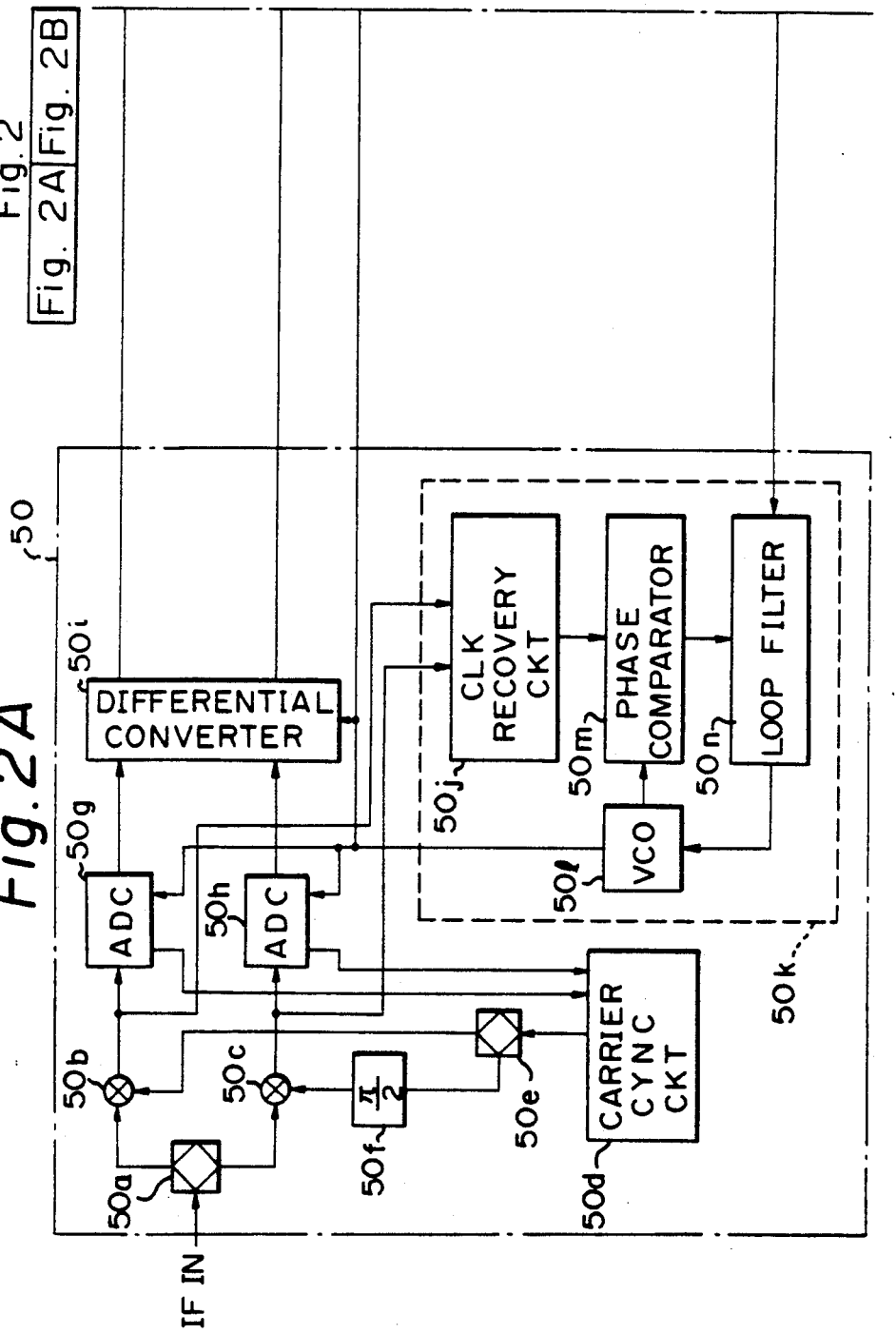

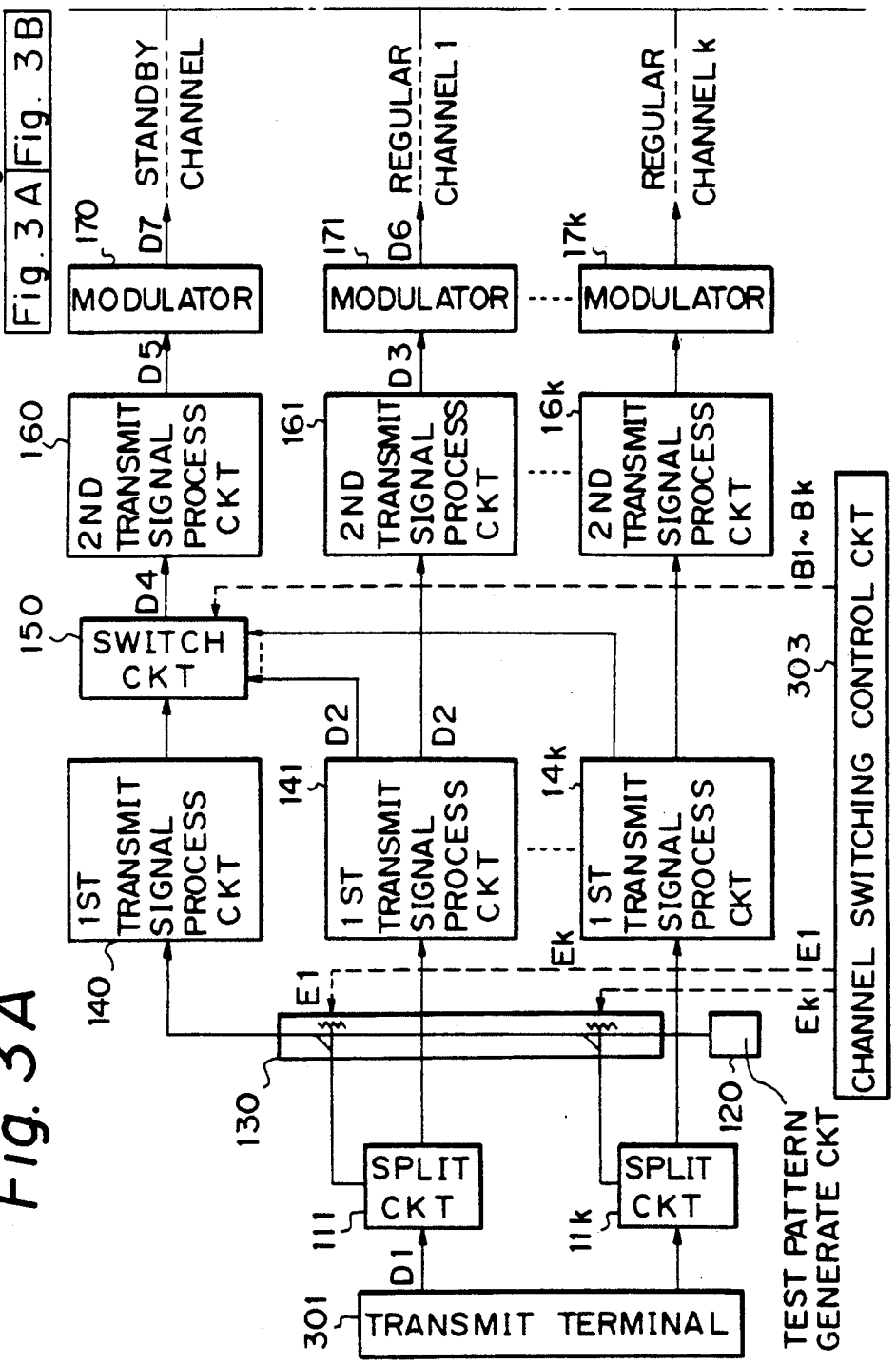

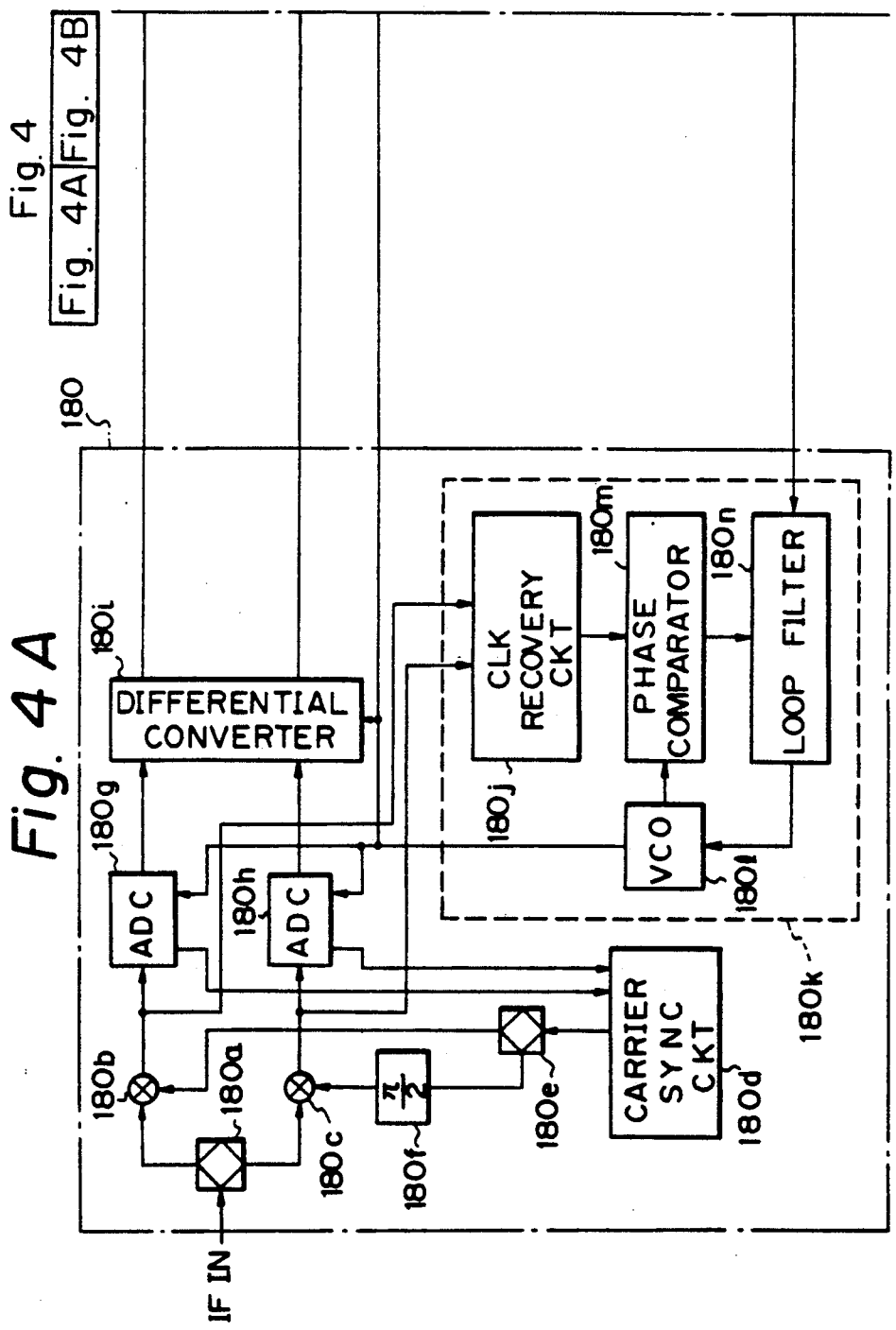

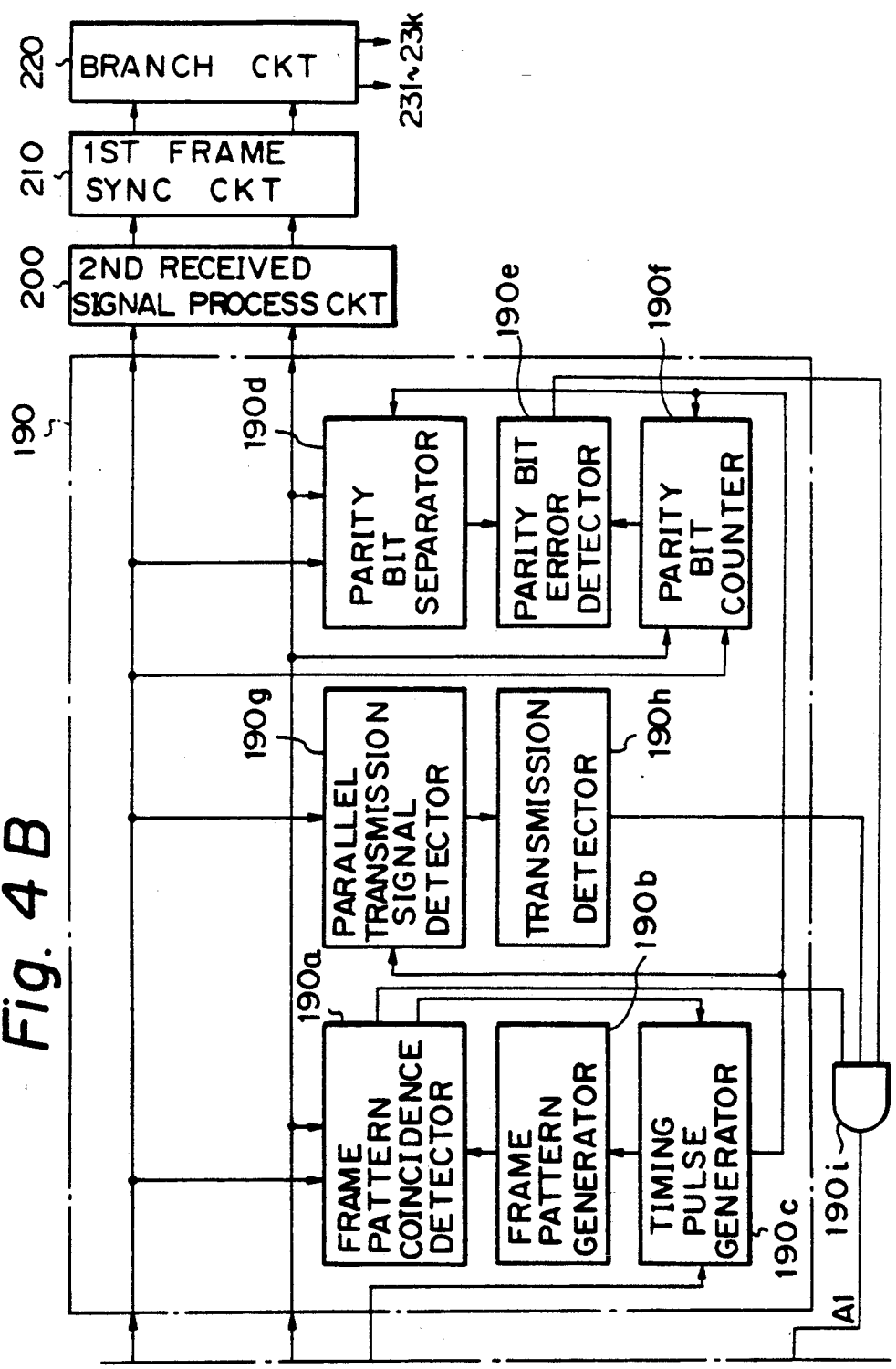

CHANNEL SWITCHING SYSTEM

This is a continuation of application Ser. No. 07/269,395 filed Nov. 10, 1988 now abandoned.

BACKGROUND OF THE INVENTION

The present invention relates to a channel switching system and, more particularly, to a channel switching system applicable to a digital radio communication system for switching a regular radio channel and a standby channel as needed.

A large capacity radio communication system customarily includes a standby radio channel in addition to regular radio channels to provide for circuit downs due to channel maintenance, fading, equipment failures and other occurrences. When a certain regular channel fails, a transmitting side connects a signal being transmitted over that regular channel to the standby channel in parallel with the regular channel while a receiving side switches the signal coming in over the regular channel to the signal coming in over the standby channel. The regular and standby channels are different from each other with respect to propagation delay and, moreover, this propagation delay is dependent upon fading and other factors. Hence, in the case that the signal to be transmitted is a data signal, the two data signals transmitted over the regular and standby channels are not always coincident with respect to timing. It follows that although a permanent component of the propagation delay difference may be compensated for beforehand, an increase in a fluctuating component beyond one clock period of the data signal brings about a bit error during channel switching at the receiving side.

To eliminate such bit errors, use is generally made of a channel switching system of the type switching the channel after setting up a bit period between the two transmitted data signals. A channel switching system with this kind of periodic switching function includes a transmit signal processing circuit for converting the speed of a data signal to be transmitted at a high speed. The resulting converted signal is fed to a modulator associated with a regular channel after frame sync bits, parity bits, check bits and other extra bits have been added to the signal. Prior to channel switching, an output data signal of a transmit signal processing circuit associated with a regular channel to be switched is connected in parallel to a modulator associated with a standby channel by a switching circuit which is installed in a transmitting terminal. A standby channel usually sends a test pattern while it is in a standby condition. A transmit signal processing circuit associated with the standby channel and adapted to insert extra bits in the test pattern is operated asynchronously with the transmit signal processing circuit of the regular channel, so that the clock of the data signal arriving at the modulator on the standby channel at the instant of parallel connection which occurs at the switching circuit of the transmitting side fluctuates. Any discontinuous fluctuation of the clock is apt to bring the modulator out of synchronism, resulting in a need for a substantial recovery time. In the light of this, the switching circuit at the transmitting side produces its own clock synchronous to the clock of an incoming data signal by using a phase locked loop and retimes the data signal with the own clock, thereby freeing the clock of an output data signal from discontinuous fluctuations.

The two signals sent over the regular and standby channels are individually demodulated by exclusive demodulators to become data signals. The two data signals each includes frame sync bits which have been inserted by the transmit signal processing circuit associated with the regular channel. A switching circuit at the receiving side causes the bits of the two data signals into coincidence by using the timing of a frame sync bit, thereby switching the channels without any bit error. The demodulator includes a phase locked loop for recovering a clock from an incoming modulated signal. By the parallel connection effected by the switching circuit at the transmitting side, the clock of the modulated signal inputted to the demodulator is changed also. Should the response speed of the phase locked loop of the demodulator be lower than the response speed of the phase locked loop of the switching circuit at the transmitting side (i.e. should the band width Bd of the former be narrower than the band width Bs of the latter), the phase locked loop of the demodulator would fail to follow the variation of the clock of the modulated signal. The result is the step-out which needs a substantial period of time to be recovered. Hence, the band width Bd has to be maintained greater than the band width Bs.

An increase in the band width Bd of the phase locked loop adapted for clock recovery lowers the carrier-to-noise (C/N) ratio of the recovered clock and thereby aggravates the bit error rate of the modulator. This is especially true when use is made of a multi-level modulation system such as a multi-level quadrature amplitude modulation (QAM) system. However, the band width Bd cannot be reduced to a sufficient degree without causing the pull-out of the demodualtor in the event of channel switching and therefore without increasing the channel switching time.

As discussed above, a dilemmatic situation with the prior art channel switching system is that the bit error rate of a modulator cannot be reduced without increasing the channel switching time.

The above-mentioned prior art is disclosed in, for example, U.S. Pat. Nos. 4,442,518 and 4,686,675.

SUMMARY OF THE INVENTION

It is therefore an object of the present invention to provide a channel switching system which allows a channel switching time to be reduced without aggravating the bit error rate of a demodulator.

It is another object of the present invention to provide a generally improved channel switching system.

A channel switching system of the present invention comprises a regular modulator for sending a regular modulated signal digitally modulated by a first data signal to a regular radio channel, a transmitting-side switching circuit for producing, in response to a channel switch command, a second data signal by retiming the first data by using a second clock which is synchronized with a first clock of the first data signal with respect to phase by a first phase locked loop, a standby modulator for sending to a standby radio channel a standby modulated signal digitally modulated by the second signal, a regular demodulator for producing a third data signal by demodulating the regular modulated signal which comes in over the regular radio channel, a standby demodulator for producing a fourth data signal by demodulating the standby modulated signal coming in over the standby radio channel by a third clock which is synchronized to a clock component of the standby modulated signal by a second phase locked loop, a receiving-side switching circuit for switching, in response to the channel switch command, the regular and standby radio channels while synchronously causing the third and fourth data signals to coincide with each other with respect to bit timing, and a varying device for making a response speed of the second phase locked loop higher than a response speed of the first phase locked loop only during an interval between the appearance of the channel switch command and the end of a channel switching operation of the receiving-side switching circuit.

BRIEF DESCRIPTION OF THE DRAWINGS

The above and other objects, features and advantages of the present invention will become more apparent from the following detailed description taken with the accompanying drawings in which:

FIGS. 2A and 2B are schematic block diagrams useful for understanding the channel switching operation of the system shown in FIG. 1;

FIGS. 3A and 3B are schematic block diagrams showing an alternative embodiment of the present invention; and FIGS. 4A and 4B are schematic block diagrams demonstrating the operation of the system shown in FIG. 3.

DESCRIPTION OF THE PREFERRED EMBODIMENTS

Figure 1A:
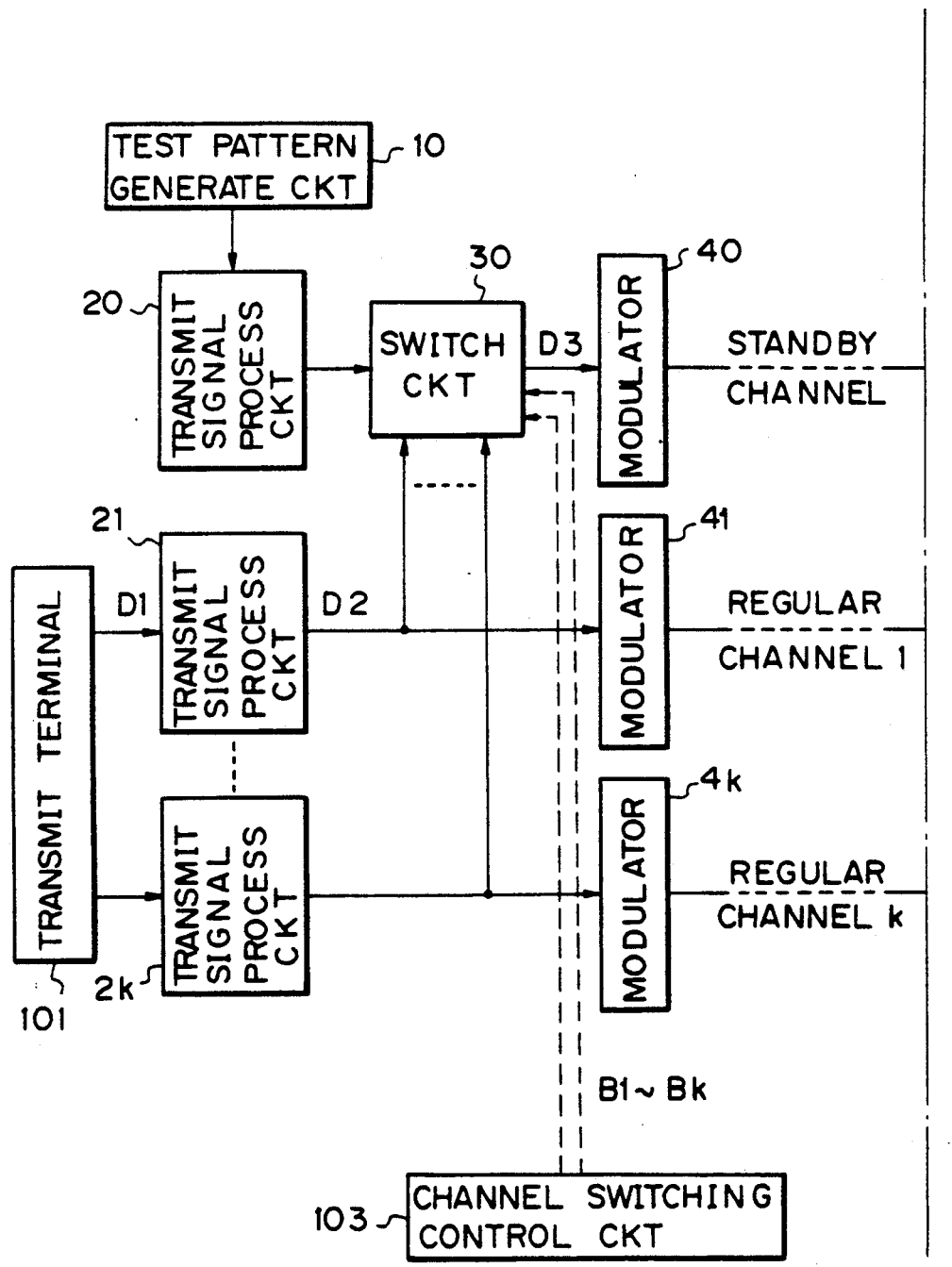
FIGS. 1A and 1B are schematic block diagrams showing a channel switching system embodying the present invention.
Figure 1B:
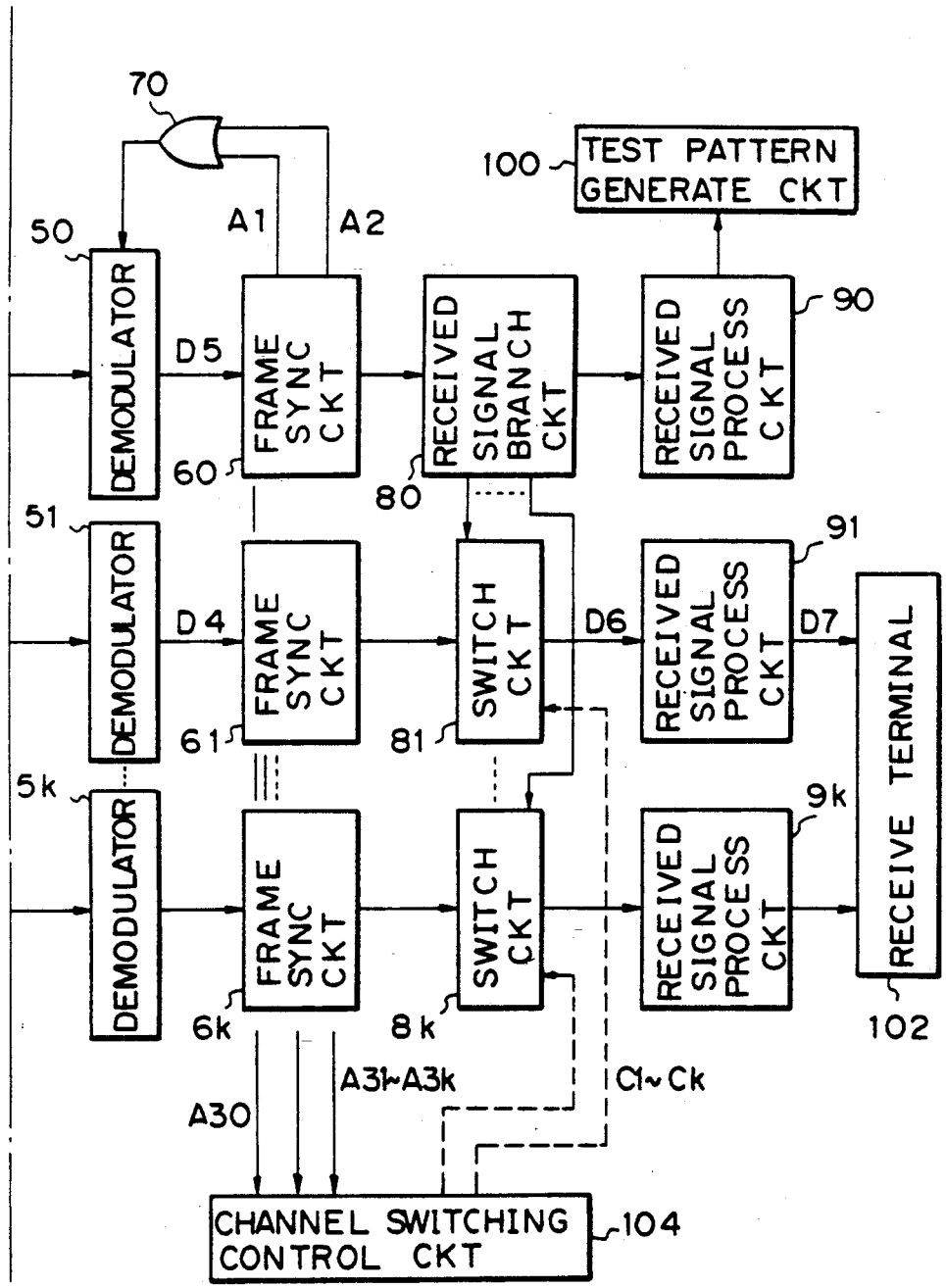

Referring to FIGS. 1A and 1B of the drawings, a channel switching system embodying the present invention is shown which is applicable to a digital communication system using k regular channels and one standby channel. As shown, the system includes a test pattern generating circuit 10 and a transmit signal processing circuit 20 to which a test pattern is fed from the test pattern generating circuit 10. Transmit signal processing circuits 21 to 2k each receives a respective one of k data signals from a transmitting terminal station 101. Data signals coming out of the transmit signal processing circuits 21 to 2k are applied to a switching circuit 30 at the transmitting side which then produces a data signal D3. A modulator 40 delivers to a standby channel a signal which has been modulated by the data signal D3. Modulators 41 to 4k which are respectively associated with the transmit signal processing circuits 21 to 2k produce signals which have been modulated by the data signals coming out of the circuits 21 to 2k, the resulting signals being individually sent over their associated regular channels. A demodulator 50 receives the modulated signal over the standby channel and produces a data signal D5. On the other hand, demodulators 51 to 5k individually receive the modulated signals over the regular channels. A frame sync circuit 60 synchronizes is frame-synchronous to and gates the data signal D5 and produces a channel alarm A1 and a frame alarm A2. The data signals outputted by the demodulators 51 to 5k are individually applied to frame sync circuits 61 to 6k to be thereby synchronized with respect to frames. An OR gate 70 produces OR of the channel alarm A1 and frame alarm A2 and delivers it to the demodulator 50. A received signal branching circuit 80 branches the data signal D5 passed through the frame sync circuit 60 into (k+1). One of the branched outputs of the branching circuit 80 is fed to switching circuits 81 to 8k provided at the receiving side. Also, the data signals gated by the frame sync circuits 61 to 6k are fed to the switching circuits 81 to 8k, respectively. One of the branched outputs of the received signal branching circuit 80 is applied to a received signal processing circuit 90. Received signal processing circuits 91 to 9k individually process the data signals from the switching circuits 81 to 8k and deliver the resulting signals to a receiving terminal station 102. A data signal coming out of the received signal processing circuit 90 is fed to a test pattern detecting circuit 100. Further included in the system are a channel switching control circuits 103 and 104. In the figure, A30 is the information indicative of the deterioration of the standby channel, A31 to A3k are the information individually indicative of the deterioration of the regular channels 1 to k, B1 to Bk are transmission switching control signals associated with the regular channels 1 to k, and C1 to Ck are reception switching control signals associated with the regular channels 1 to k.

The transmit signal processing circuit 21, for example, receives a data signal D1 from the transmitting terminal station 101 and transforms it into a data signal D2 by changing its rate and adding frame sync bits, parity check bits and other extra bits. The modulator 41 associated with the signal processing circuit 21 produces a modulated signal which has been modulated by the data signal D2. This modulated signal is sent over the regular channel 1 and then demodulated by the demodulator 51 to become a data signal D4. Hence, the data signal D4 is a data signal produced by regenerating the data signal D2. The frame sync circuit 61 plays a role to detect frame sync bits out of the data signal D4 for frame synchronizing purpose and a role to monitor the quality of the regular channel between the modulator 41 and the demodulator 51 by referencing the parity check bits. If the regular channel is free from faults, the receiving-side switching circuit 81 outputs the data signal D4 passed through the frame sync circuit 61 as a data signal D6 directly. The received signal processing circuit 91 converts the data signal D6 into a data signal D7 by a conversion procedure which is opposite to that of the transmit signal processing circuit 21. The data signal D7 is a regenerated signal of the data signal D1 and fed to the receiving terminal station 102.

When all the regular channels are normal and the standby channel is in a standby condition, the transmitting-side switching circuit 30 retimes the data signal coming out of the transmit signal processing circuit 20 and delivers the resulting signal as a data signal D3. In this case, a test pattern outputted by the test pattern generating circuit 10, like the data signal D2, is routed through the transmit signal processing circuit 20, switching circuit 30, modulator 40, standby channel, demodulator 50, frame sync circuit 60, received signal branching circuit 80 and received signal processing circuit 90 to the test pattern detecting circuit 100. The test pattern arriving at the circuit 100 is used to monitor the standby channel.

Channel switching is executed as follows. Assume that the frame sync circuit 61 has detected the deterioration of the regular channel 1 and has fed the information A31 representative of such deterioration to the channel switching control unit 104. In response, the control unit 104 delivers a channel switch command to the transmitting-side switching circuit 30 and receiving-side switching circuit 81 i.e., a switch command is sent over a channel of the opposite direction, not shown.

This command causes the switching circuit 30 to retime the data signal D2 to produce the data signal D3. Nevertheless, since the switching circuit 30 obtains its own clock in synchronism, with respect to phase, with the data signal which comes in over the phase-locked loop, the clock of the data signal D3 retimed by the own clock is prevented from becoming discontinuous despite the switching operation. The data signal D5 applied to the frame sync circuit 60 is changed by such a switching operation at the transmitting side from the data signal outputted by the signal processing circuit 20 (more specifically a regenerated signal of the data signal) to the data signal D2 (more specifically a regenerated signal of the data signal D2). Hence, the frame sync bit in the data signal D5 is also changed from the bit inserted by the signal processing circuit 20 to the bit inserted by the signal processing circuit 21. As a result, the frame sync circuit 60 is pulled out and therefore generates the channel alarm A1 (associated with channel quality) and the frame sync alarm A2. These alarms A1 and A2 are fed to the demodulator 50 via the OR gate 70. The procedure described so far will be explained in more detail with reference to FIG. 2.

Figure 2B:
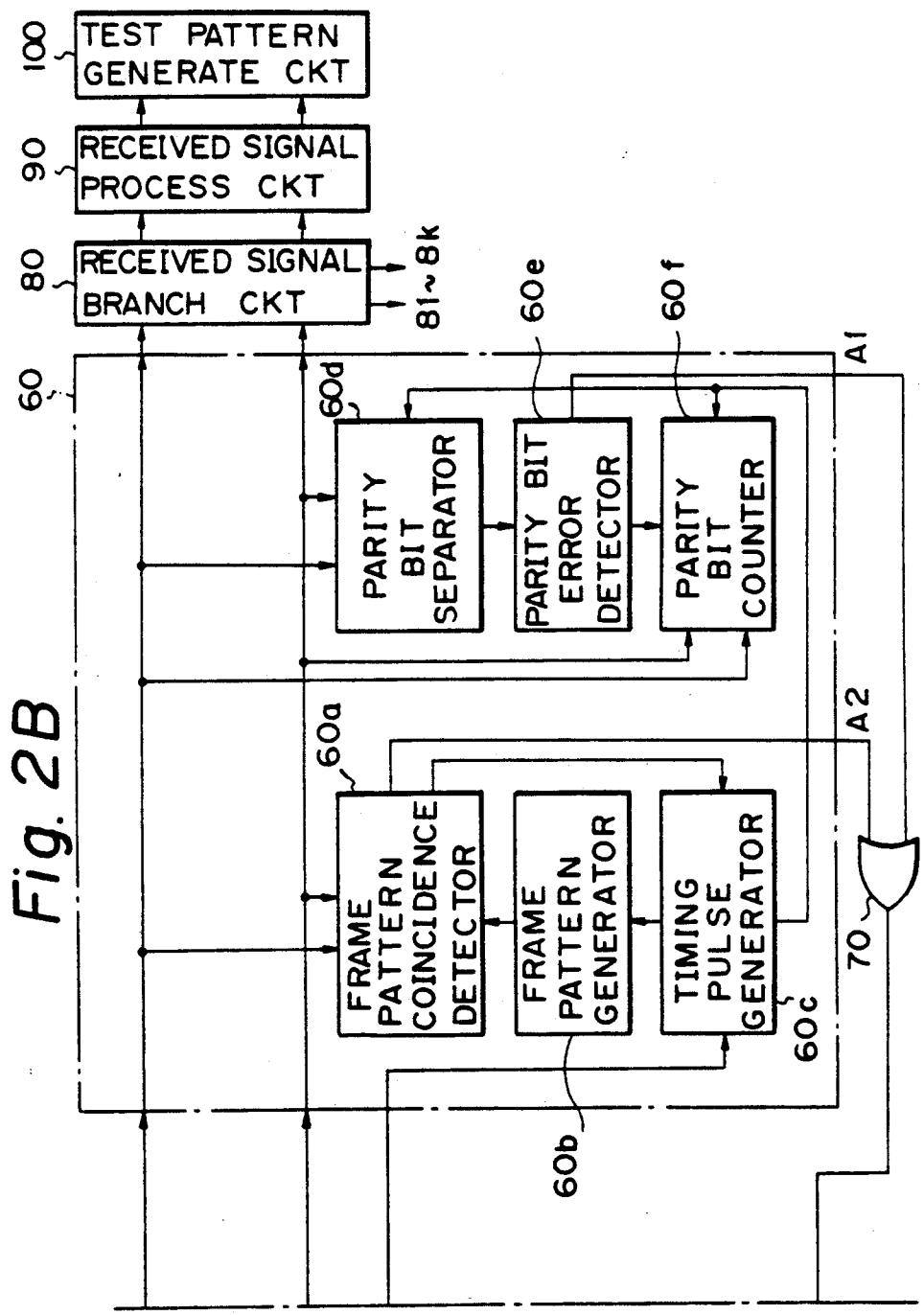

In FIG. 2A, the demodulator 50 includes a branching circuit 50a for branching an intermediate frequency (IF) input into two routes which individually extend to phase detectors 50b and 50c. A carrier sync circuit 50d supplies the phase detectors 50b and 50c with carrier waves via a splitting circuit 50e. One of these carrier waves is shifted by $\pi/2$ by a circuit 50f relative to the other carrier wave. Using any of such carrier waves, each phase detector 50b or 50c detect the IF input to convert it into a baseband signal which is then fed to an analog-to-digital converter (ADC) 50g or 50h. Digital signals from the phase detectors 50b and 50c are fed to a differential converter 50i and then to the frame sync circuit 60. A clock (CLK) recovery circuit 50j separates a clock component from the detected baseband signal. The clock recovery circuit 50j forms a part of a clock sync circuit 50k for synchronizing this clock to that of the transmitting side with respect to phase. More specifically, the clock sync circuit 50k includes a voltage controlled oscillator (VCO) 50l, a phase comparator 50m and a loop filter 50n in addition to the clock recovery circuit 50j. The phase comparator 50m compares the clock from the circuit 50j with an output of the VCO 50l with respect to phase, and the resulting output voltage of the phase comparator 50m is passed through the loop filter 50n to set up the synchronization of the VCO 50l. An arrangement is made such that the bad width Bd of the loop filter 50n is controllable. More particularly, the band-width Bd is narrowed when both the channel alarm A1 and the frame alarm A2 are absent (i.e., when the output of the OR gate is absent). As shown in FIGS. 2A and 2B, when the detector 60a detects a frame sync error or when the detector 60e detects a parity bit error, the band-width Bd of the loop filter is controlled by the resultant output of the OR gate 70.

In FIG. 2B, the frame sync circuit 60 detects frame sync bits out of the sequence of signals from the demodulator 50 and compares them in phase with an output of a frame pattern generator 60b which is included in the circuit 60. A frame pattern coincidence detector 60a determines whether the frame sync bits agree with the frame pattern outputted by the frame pattern generator 60b, in response to timing pulses which are fed from a timing pulse generator 60c. Further, a parity bit separator 60d detects parity bits out of the signal sequence from the demodulator 50 while a parity bit counter 60f counts the parity bits detected. A parity bit error detector 60e is responsive to errors in the parity bits, thereby monitoring the channel quality. The frame alarm (pullout) A2 and the channel alarm (parity bit error) A1 from the frame sync circuit 60 are ORed by an OR gate 70. A connection is made such that the band width Bd of the loop of the clock sync circuit 50k of the demodulator 50 is variable in response to an output of the OR gate 70, because frame synchronization is usually set up within a short period of time. More specifically, the band width Bd of the loop should be prevented from being restored before the end of synchronous switching. In a normal condition wherein the channel alarm A1 and frame alarm A2 and therefore the output of the OR gate 70 is absent, the band width Bd is maintained sufficiently narrow to enhance the C/N ratio of the recovered clock and thereby the bit error rate of the demodulator 50.

The channel deterioration information A31 outputted by the regular channel 1 is fed to the channel switching control unit 104 at the receiving side. Simultaneously, the channel switching control unit 103 at the transmitting side sends a regular channel 1 switching control signal B1 to the switching circuit 30. Then, a frame sync signal is fed from the transmit signal processing circuit 21 to the frame sync circuit 60 which is associated with the standby channel. This causes the frame pattern coincidence detector 60a to produce the frame alarm A2 while causing the parity bit error detector 60e to produce the channel alarm A1. Consequently, the loop filter 50n is controlled to increase the band width Bd of the loop of the clock sync circuit 50k of the demodulator 50 which is associated with the standby channel. More specifically, the control output of the OR gate 70 increases the band width Bd of the demodulator loop beyond the band width Bs of the loop of the switching circuit 30. The wider band width Bd makes the response speed of the phase locked loop of the demodulator 50 higher than that of the phase locked loop of the switching circuit 30. In this condition, the phase locked loop of the demodulator 50 is capable of following any change in the clock of the modulated signal and therefore free from pull-out.

As soon as the frame synchronization of the frame sync circuit 60 is set up again, the receiving-side switching circuit 81 selects the data signal D5 coming in via the received signal branching circuit 80 and delivers it in the form of a data signal D6. Bit synchronization of the data signals D4 and D5 has already been discussed. The duration of the wider band width Bd of the demodulator 50 is selected such that it is decreased again upon completion of the changeover at the switching circuit 81. This may generally be implemented by the recovery of the channel alarm, i.e., parity bit of associated with the standby channel because a value less than $10^{-6}$ in terms of BER (Bit Error Rate) is used for channel recovery. In some applications for which such an implementation does not suffice, use may be made of a timer. In the case that the standby channel is repeated by a regenerative repeater, a demodulator of the repeater should also be provided with a phase locked loop for clock recovery whose band width is capable of increasing during channel switching.

Figure 3B:
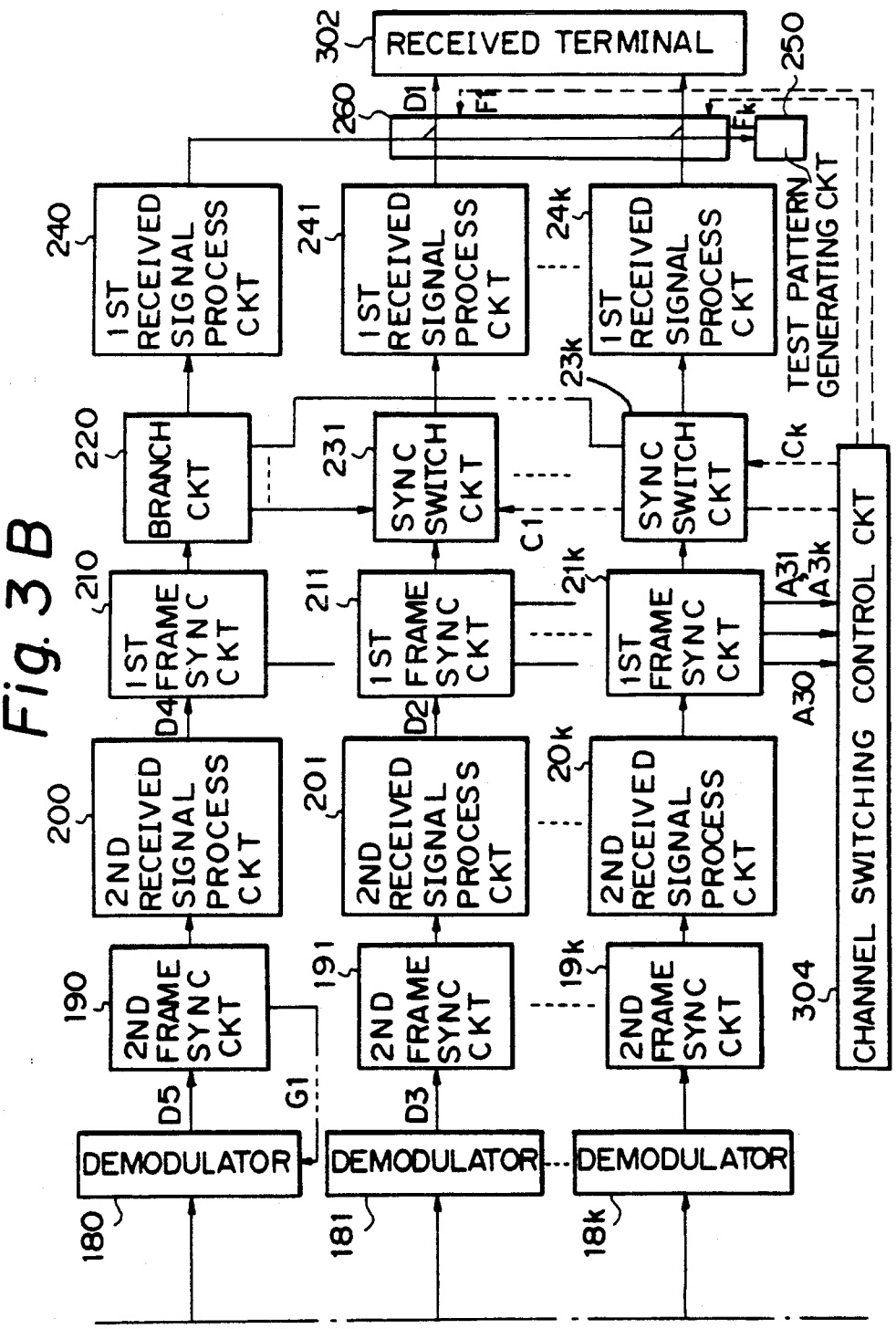

Referring to FIGS. 3A and 3B, an alternative embodiment of the present invention is shown which is also applicable to a digital radio communication system having k regular channels and one standby channel. As shown, the system includes splitting circuits 111 to 11k, a test pattern generating circuit 120, a switching unit 130, a first transmit signal processing circuit 140 to which an output of the switching unit 130 is applied, and first transmit signal processing circuits 141 to 14k each receiving on of two split outputs of a respective one of the splitting circuits 111 to 11k. A transmitting-side switching circuit 50 receives an output of the first transmit signal processing circuit 140 and one of two branched outputs of each of the first transmit signal processing circuits 141 to 14k and produces a data signal D4. A second transmit signal processing circuit 160 delivers a data signal D5 in response to the data signal D4. Second transmit signal processing circuits 161 to 16k receive the other of the two outputs of the first transmit signal processing circuits 141 to 14k, respectively. The data signal D5 from the signal processing circuit 160 is fed to a modulator 170 which in turn delivers a data signal D7 to the standby channel. Modulators 171 to 17k receive respectively the data signals from the processing circuits 161 to 16k and send data signals to the regular channels 1 to k. The modulated signal sent over the standby channel is applied to a demodulator 180 which then produces a data signal D5. On the other hand, the modulated signals sent over the regular channels 1 to k are respectively fed to demodulators 181 to 18k. The data signal D5 from the demodulator 180 is routed to a second frame sync circuit 190. The data signals from the demodulators 181 to 18k are applied to second frame sync circuits 191 to 19k, respectively. The system further includes second received signal processing circuits 200 and 201 to 20k, and first frame sync circuits 210 and 211 to 21k to which the outputs of the signal processing circuits 200 and 201 to 21k are applied, respectively. A branching circuit 220 branches the output of the first frame sync circuit 210 into (k+1). One of the branched outputs of the branching circuit 220 and the outputs of the frame sync circuits 211 to 21k are fed to sync switching circuits 231 to 23k. The output of the branching circuit 220 is coupled to a first received signal processing circuit 240. The outputs of the sync switching circuits 231 to 23k are fed to first received signal processing circuits 241 to 24k, respectively. Also included in the system are a test pattern generating circuit 250 and a switching unit 260. The outputs of the first received signal processing circuits 240 and 241 to 24k are connected to the switching unit 260. In the figure, A30 is the information indicative of degradation of the standby channel, A31 to A3k are respectively the information indicative of degradation of the regular channels 1 to k, B1 to Bk are transmission switching control signals associated respectively with the regular channels 1 to k, C1 to Ck are sync switching control signals associated with the regular channels 1 to k, E1 to Ek and F1 to Fk are channel switching control signals, and G1 is a band control signal.

In operation, assume that all the channels are free from faults and the standby channel is in a stand-by state. One of the data signals from the transmitting terminal station 301 such as a data signal D1 is routed through the splitting circuit 111 to the first transmit signal processing circuit 141. The signal processing circuit 141 applies bipolar-to-unipolar conversion and speed conversion to the data signal D1 while adding extra bits to the data signal D1 to construct a first frame, the resulting signal being delivered as a data signal D2 to the second transmit signal processing circuit 161. A data signal D3 appearing on the output of the signal processing circuit 161 is modulated by the modulator 171. A modulated output or data signal D6 from the modulator 171 is transmitted over the regular channel 1 to the demodulator 181. In response, the demodulator 181 demodulates the signal D6 to produce the data signal D3 and feeds it to the second frame sync circuit 191. The second received signal processing circuit 201 transforms the data signal D3 into the data signal D2 in synchronism with the second frame of the data D3. The first frame sync circuit 211 produces a frame pulse in synchronism with the frame of the data signal D2, i.e., first frame. In the illustrative embodiment, the frame pulse and data signal D2 are routed through the sync switching circuit 231 to the first received signal processing circuit 241. By using the input frame pulse, the signal processing circuit 241 converts the data signal D2 into the data signal D1. This signal D1 is delivered to a receiving terminal station 302 via the switching unit 260. The other data signals which may be applied from the transmit terminal 301 to the system are also sent over the individual regular channels to the receiving terminal 302.

In the illustrative embodiment, a test pattern outputted by the test pattern generating circuit 120 is fed to the test pattern generating circuit 250 via the switching unit 130, first transmit signal processing circuit 140, transmitting-side switching circuit 150, second signal processing circuit 160, modulator 170, standby channel, demodulator 180, second frame sync circuit 190, second received signal processing circuit 200, first frame sync circuit 210, branching circuit 220, first received signal processing circuit 240, and switching unit 260.

When the regular channel 1 for sending the data signal D3, for example, undergoes deterioration due to channel maintenance, fading or similar cause, it may be switched to the standby channel by the following procedure. As the control signals from the channel switching control unit 303 is fed to the transmitting-side switching circuit 150, the switching circuit 150 switches the data signal D4 from the output of the first transmit signal processing circuit 140 to the output of the first transmit signal processing circuit 141. At this instant, information indicative of the parallel connection set up at the transmitting side is inserted in the main signal time slot of the signal processing circuit 160. Consequently, the data signals D5 and D3 fed from the signal processing circuits 160 and 161 to the standby channel and the regular channel, respectively, become identical with each other except for the extra bits which have been inserted by the circuits 160 and 161. The switching circuit 150 therefore sets up a parallel transmission condition. The signal processing circuit 160 is originally provided with a function of buffering an input data signal in order to implement speed conversion. For this reason, although the clock of the data signal D4 may vary intermittently due to the parallel transmission operation of switching circuit 150, the clock of the output data signal D5 does not change. It follows that the switching circuit 150 does not need a clock buffering function and needs only a switching function of outputting one of incoming data signals. Further, since the second frame of the data signal D5 arriving at the processing circuit 200 is not changed due to the parallel connection by the switching circuit 150, the frame synchronization at the second frame is not influenced by the parallel transmission at all. This surely prevents the conversion from the data signal D5 to the data signal D4 performed by the processing circuit 200 from being interrupted by the parallel operation.

The system will be operated for sync switching as described hereinafter with reference to FIGS. 4A and 4B. In the figure, a demodulator 180 includes a branching circuit 180a which branches an IF input into two routes which individually extend to phase detectors 180b and 180c. The phase detectors 180b and 180c detect the IF input in response to carrier waves fed from a carrier sync circuit 180d (one of the carrier waves is branched from the other by a branching circuit 180e and shifted by $\pi/2$ by a circuit 180f), thereby producing a baseband signal each. The outputs of the phase detectors 180b and 180c are individually converted into digital signals by ADCs 180g and 180h, then applied to a differential converter 180i, and then fed to the second frame sync circuit 190. A clock recovery circuit 180j separates a clock component from the detected baseband signal. The clock recovery circuit 180j constitutes a clock sync circuit 180k in cooperation with a VCO 180l, a phase comparator 180m, and a loop filter 180n. The phase comparator 180 compares the clock from the clock recovery circuit 180j and the output signal of the VCO 180l with respect to phase, and an output voltage of the phase comparator 180 is passed through the loop filter 180n to set up synchronization of the VCO 180l.

The second frame sync circuit 190, like the frame sync circuit 60 of FIG. 2B, includes a frame pattern coincidence detector 190a, a frame pattern generator 190b, a timing pulse generator 190c, a parity bit separator 190d, a parity bit error detector 190e, and a parity bit counter 190f. In the illustrative embodiment, the circuit 190 further includes a parallel transmission signal detector 190g and a transition detector 190h. In such a second frame sync circuit 190, the variation of the parallel transmission condition (switching or reswitching) is monitored by the transition detector 190h on the basis of the main signal time slot. Since sync switching has to be performed only when the standby channel is normal, i.e., when both the frame alarm and the parity check error exist, the band width Bd of the demodulator 180 which is associated with the standby channel is controlled only when such two conditions hold together. This control is executed only for a predetermined duration in which the sync switching is completed. In the event of sync switching or reswitching, the band width Bd of the demodulator 180 associated with the standby channel is made wider than the band width Bs of the loop of the second transmit signal processing circuit 160 which is also associated with the standby channel for a predetermined period of time which is necessary for the switching operation to complete. Consequently, the band width Bd is increased to make the response speed of the phase locked loop of the demodulator 180 higher than that of the phase locked loop of the second transmit signal processing circuit 160, whereby the phase lock loop of the demodulator 180 is capable of following any change in the clock of the modulated signal.

The first frame associated with the first frame sync circuit 210 is switched from the one constructed by the first transmit signal processing circuit 140 to the one constructed by the first transmit signal processing circuit 141 due to the parallel transmission. At this instant, the frame sync circuit 210 is pulled out and then restored immediately. As the frame synchronization of the circuit 210 is reestablished, the channel switching control unit 304 controls the branching circuit 220 and sync switching circuit 210 so that the data signal appearing on the output of the switching circuit 231 is switched from the data signal D2 to the data signal D4 without any bit error. The data D4 is converted into the data D1 by the first received signal processing circuit 241.

The other regular channels may selectively be switched to the regular channel synchronously in the same manner as the regular channel 1 described above. Again, when any of the channels becomes down due to an equipment failure or similar cause, it is recovered by using the switching units 130 and 260. If desired, the parity check bits inserted in the data signals by the first transmit signal processing circuits 140 and 141 to 14k and those inserted by the second transmit signals processing circuits 160 and 161 to 16k may be used one for interval check bits and the other for hop check bits.

In summary, in accordance with the present invention, a demodulator associated with a standby channel has a phase locked loop for clock recovery the band width of which is variable. Only when a channel switching operation is under way, the band width of the phase locked loop is increased to prevent clock synchronization from failing. This allows the band width to be reduced under steady conditions (periods other than the channel switching period) for the purpose of improving the bit error rate of the demodulator, without entailing any increase in the channel switching time. Conversely, the channel switching time can be reduced without aggravating the bit error rate of the demodulator. Furthermore, the decrease in the band width improves a jitter characteristic under steady conditions.

Various modifications will become possible for those skilled in the art after receiving the teachings of the present disclosure without departing from the scope thereof.

What is claimed is:

1. A channel switching system comprising:

regular modulator means for sending a regular modulated signal digitally modulated by a first data signal to a regular radio channel;

control means for producing a channel switch command;

a first phase locked loop for producing a second clock signal;

transmitting-side switching means, operatively connected to said first phase locked loop and said control means, for producing, in response to the channel switch command, a second data signal by retiming the first data signal by using the second clock which is synchronized with a first clock of the first data signal with respect to phase by said first phase locked loop;

standby modulator means, operatively connected to said transmitting-side switching means, for sending to a standby radio channel a standby modulated signal digitally modulated by the second data signal;

regular demodulator means for producing a third data signal by demodulating the regular modulated signal which comes in over said regular radio channel;

standby demodulator means for producing a fourth data signal by demodulating the standby modulated signal coming in over said standby radio channel by a third clock which is synchronized to a clock component of the standby modulated signal by a second phase locked loop;

standby frame synchronization means, operatively connected to said standby demodulator means, for synchronizing the fourth data and detecting a frame error and a channel error;

receiving-side switching means, operatively connected to said regular demodulator means, said standby demodulator means and said control means, for switching, in response to the channel switch command, said regular and standby radio channels while synchronously causing the third and fourth data signals to coincide with each other with respect to bit timing; and varying means for making a response speed of said second phase locked loop higher than a response speed of said first phase locked loop only when the frame error or the channel error is detected at the standby frame synchronization means.

2. A system as claimed in claim 1, wherein said varying means comprises an OR circuit.

* * * * *